United States Patent [19]
Levin

[11] 3,730,076
[45] May 1, 1973

[54] ROASTING BAG

[75] Inventor: Myron M. Levin, Highland Park, Ill.

[73] Assignee: E-Z Por Corporation, Niles, Ill.

[22] Filed: July 21, 1971

[21] Appl. No.: 164,780

[52] U.S. Cl. ........................................99/347, 99/446
[51] Int. Cl. ..............................A47j 37/10, A47j 37/01
[58] Field of Search ....................99/347, 171 H, 194, 99/444, 445, 446; 229/53, 54, 55; 55/361, 373, 382

[56] References Cited

UNITED STATES PATENTS

| | | | |
|---|---|---|---|
| 3,323,442 | 6/1967 | Rader | 99/347 |
| 3,012,894 | 12/1961 | Nagel | 99/171 H X |
| 3,507,443 | 4/1970 | Gerard | 229/55 |
| 3,322,319 | 5/1967 | Sweeney et al. | 99/171 H UX |
| 3,038,811 | 6/1962 | Reading | 99/171 H |
| 3,539,354 | 11/1970 | Colvin | 99/171 H X |

Primary Examiner—William I. Price
Assistant Examiner—Arthur O. Henderson
Attorney—Max R. Kraus

[57] ABSTRACT

A bag for use in roasting and cooking food products, such as meat, fowl, fish and the like, which bag is formed of an inner layer of paper material and an outer layer of aluminum foil bonded to the paper material, with the side of the bag which forms the bottom when the food product is placed therein provided with slits to form vent openings for draining of the fat and condensate from the bag into a pan in which the bag and food product is placed. During roasting the fat, juices and basting material from the food product are captured within the bag and fall back on and against the food product to provide a self-basting process and the flavor of the cooked food product is greatly increased. The cooking time can be decreased, and the mess caused by normal spattering against the interior of the oven during the cooking process is eliminated.

13 Claims, 6 Drawing Figures

Patented May 1, 1973 3,730,076
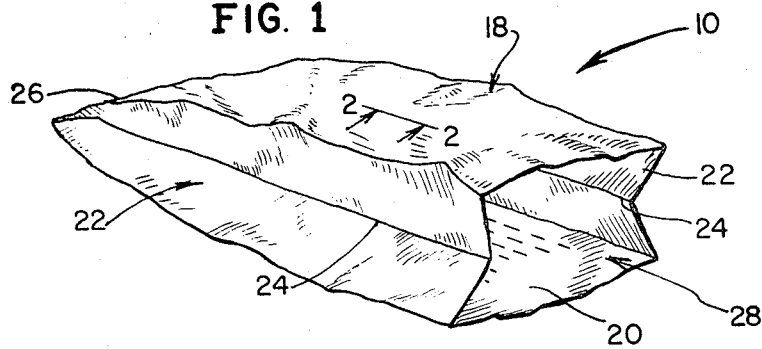
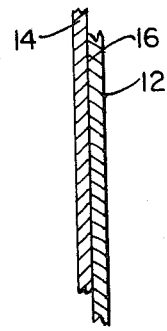
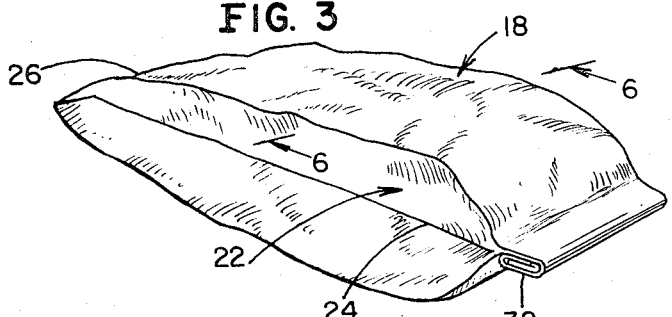
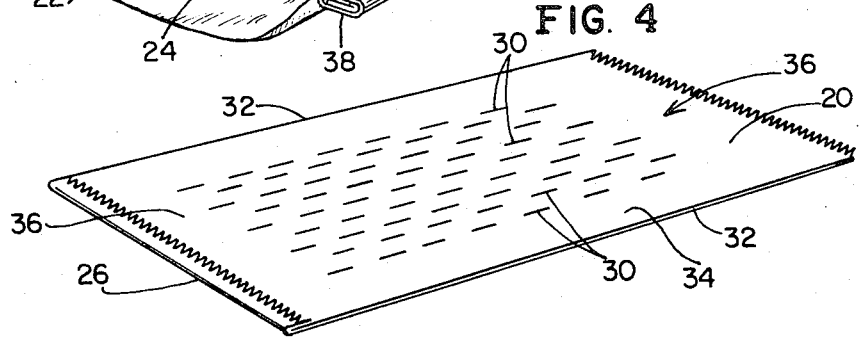
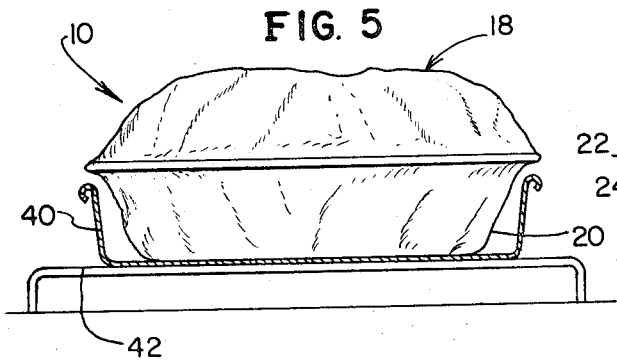
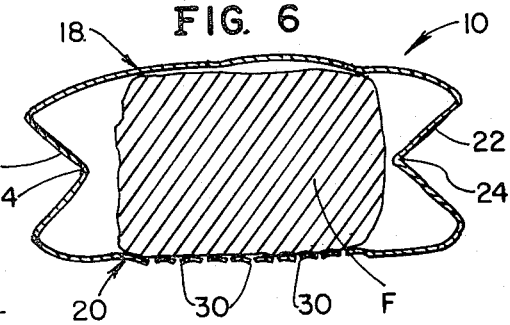
Inventor
MYRON M. LEVIN
BY
Max R. Kraus
ATTY.

ROASTING BAG

BRIEF SUMMARY OF THE INVENTION

In roasting food products, such as roast beef, ham, pork, fowl, such as chicken and turkey, and in baking fish, the said food product is placed in a pan and then heated in an oven. Usually such food products must be basted with a suitable basting material such as shortening or pan drippings frequently which is time-consuming and in many instances the basting material is expended without obtaining the full benefit thereof, resulting in roasts which do not retain their juices. Also, the spattering occurring during the roasting process necessitates cleaning the oven. These objectionable characteristics are eliminated by the use of the present invention.

The present invention provides a bag formed of at least two layers of material, the inner layer being formed of a paper material, such as kraft paper, on which is superimposed an aluminum foil bonded thereto which forms the second or outer layer. One side of the bag which forms the lower portion thereof is provided with spaced slits forming vents. The food product when enveloped in this bag is heated in the manner to be described. The food product thus enveloped will be cooked in less time than previously required and it will be self-basting as the fat, juices and basting material instead of spattering away from the food will be retained in the bag. The flavor will be better and the roast will be juicier. The slits or vent openings will permit drainage from the bottom of the bag into the pan without spattering or messing up the interior of the oven.

BRIEF DESCRIPTION OF THE DRAWINGS

In the drawings:

FIG. 1 is a perspective of the bag forming this invention with the bag open and expanded to receive the food product.

FIG. 2 is an enlarged section taken on line 2—2 of FIG. 1.

FIG. 3 is a view of said bag with the food product therein and with the open end of the bag folded over to seal the open end.

FIG. 4 is a view showing the slits formed on one side of the bag which forms the underside.

FIG. 5 shows the bag and food product in a roaster pan and resting on a roasting rack in the oven, and FIG. 6 is a sectional view taken on line 6—6 of FIG. 3.

The bag generally indicated at 10 is formed of an inner layer of paper material 12, preferably a kraft paper, on which is superimposed an aluminum foil 14 which forms the outer layer of the bag. The outer layer of aluminum foil is bonded as at 16 to the inner paper material by a suitable adhesive which makes the two layers appear as an integral layer.

The bag comprises a pair of sides 18 and 20 with ends 22 which when the bag is collapsed are folded inwardly as at 24 so that the sides 18 and 20 are adjacent each other. The bottom 26 of the bag is closed and the top 28 is open to receive the food product F. The bag may be opened and expanded, as shown in FIG. 1, to increase its capacity for inserting and retaining the food product F by unfolding the ends 22.

One side of the bag, indicated by the numeral 20, is provided with spaced slits 30 which are arranged in spaced rows to extend longitudinally, the slits of one row being staggered with respect to the adjacent row. The slits extend through both layers to form the vent openings. The side 20 of the bag containing the slits 30 forms the bottom side of the bag for the food product positioned therein. As best seen in FIG. 4, the slits 30 do not extend across the entire area of the side 20 of the bag which forms the bottom surface. Preferably the slits 30 are centrally positioned inwardly of the opposite edges 32 and inwardly of the top and bottom of the side 20 of the bag so that the surfaces 34 adjacent the opposite edges and the surfaces 36 adjacent the top and bottom are unslitted. With this arrangement the slitted portion of the bag will be positioned directly over the bottom surface of the roasting pan to allow the venting and drainage, as will be hereinafter described, without allowing spattering through the unslitted portions of said sides.

If the food product F is fowl, such as chicken or turkey, the outside and cavity of the fowl is brushed with melted butter or margarine, properly seasoned, and the fowl is placed in the bag 10 and the bag is closed as at 38, as shown in FIG. 3, by folding over several times the open end of the bag and this seals the open end. If the food product F is fish, it is also brushed with melted butter or the like and seasoned if so desired. Beef and pork are also seasoned before placing in the bag. Ham can be fixed in any manner desired before being placed in the bag. In all instances the side 20 with the slits 30 forms the bottom. The bag containing the food F is then placed in a metal roasting pan 40 which could be an aluminum foil pan and before the bag and its contents are placed into the oven, the oven is preheated to the proper temperature, usually between 300° to 400°, depending on the food to be roasted, for example, for roast beef, chicken, pork and fish the oven is preheated to approximately 350°, for ham 325° and for turkey approximately 400°. In the oven the food product contained within the bag as well as the bag is heated for a period of 3 to five and three-quarters hour, dependent on the weight and character of the food product. Preferably, the pan should rest on a roasting rack 42 in the oven.

During the cooking process the condensate, fat and juices from the food product, which can be either frozen or thawed, will be enveloped within the bag 10 and fall back on the food F to keep it continuously basted during the cooking process. The bag therefore maintains a self-basting process and retains the heat and the cooking time is considerably reduced. The bag 10 will keep the natural juices locked in, therefore, a more tender and tasteful product is produced.

Since the bag prevents spattering onto the inside walls of the oven the oven does not have to be cleaned after each cooking procedure. All the normal mess attendant conventional cooking and roasting is eliminated. Whatever juices and condensate pass through the slits 30 in the bottom of the bag are collected and retained in the pan 40 and only the pan has to be cleaned if it is a reusable pan or if it is a disposable aluminum foil pan it can be thrown away.

The paper liner 12 which forms the interior of the bag is generally porous and serves to absorb some of the moisture, condensate, juices and fats formed in the bag, while the exterior surface of aluminum foil 14 is non-porous and serves to retain the juices in the food, except for that which passes through the bottom slits. The aluminum foil keeps the food product from burning.

To brown the food product the top side 18 of the bag is slitted and folded down to expose the top of the food product and this is done during the last twenty minutes of roasting time.

The bag 10 forming this invention is flexible in the nature of conventional paper bags formed of kraft paper and may be folded if necessary for packaging and storing, similar to conventional paper bags. The opposite ends 22 of the bag are folded inwardly as at 24 to collapse the bag and are unfolded or expanded as in FIG. 1 to increase the capacity in the manner of conventional paper bags.

What is claimed is:

1. A roasting bag formed of a paper material covered with an aluminum foil which aluminum foil forms the exterior surface of said bag, said bag being flexible and open on at least one end thereof, said bag adapted to receive a food product therein for roasting, with the open end of the bag adapted to be closed when the food product is placed in said bag and prior to introduction to heating, said bag including spaced sides, one of said spaced sides forming the bottom of the bag when the bag and food product is heated in an oven and said bottom side having spaced slits formed therein.

2. A bag as set forth in claim 1 in which the plurality of spaced slits extend through said paper and foil.

3. A bag as set forth in claim 1 in which the slits are arranged in spaced rows with the slits in one row staggered with respect to the slits in the adjacent row.

4. A bag as set forth in claim 1 in which the bottom side of the bag is provided with spaced openings which extend inwardly of the opposite side edges and the top and bottom of said side of the bag to provide non-perforate portions on said bottom side.

5. A bag as set forth in claim 1 in which the paper layer is generally porous and the aluminum layer is substantially non-porous.

6. A bag as set forth in claim 1 in which the paper material is kraft paper and is substantially porous and in which the aluminum foil is substantially non-porous.

7. A bag as set forth in claim 1 in which the oven is preheated to a temperature of between 300° and 400° F. prior to introduction of the bag and food product into the oven.

8. A bag as set forth in claim 1 which is placed in a roaster pan when positioned in the oven.

9. A bag as set forth in claim 1 in which the slits extend inwardly of the opposite side edges and the top and bottom of said bottom side of the bag to provide non-perforate portions on said bottom side.

10. A bag as set forth in claim 1 in which the other of the spaced sides forms the top of the bag and said top side is imperforate.

11. A roasting bag formed of an inner layer of porous material and an outer layer of an aluminum foil which forms the exterior surface of said bag, with said inner layer bonded to said outer layer, said bag being flexible and open on at least one end thereof, said bag adapted to receive a food product therein for roasting, with the open end of the bag adapted to be closed when the food product is placed in said bag and prior to introduction to heating, said bag comprising a top side and a bottom side, said bottom side having spaced openings therein so that when said food product in the bag is positioned in a pan in an oven and heated certain of the juices and liquid material will pass through said bottom openings and be collected and retained in the pan and with certain of said juices and liquid material retained captured in the bag to fall back on and against the food product in the bag to provide a self-basting of the food product.

12. A bag as set forth in claim 11 in which the top side of the bag is imperforate.

13. A bag as set forth in claim 12 in which the porous material serves to absorb some of the juices and liquids within the bag.

* * * * *